United States Patent [19]

Bruke

[11] Patent Number: 4,922,768
[45] Date of Patent: May 8, 1990

[54] DRIVING DEVICE

[75] Inventor: Richard Bruke, Bunkeflostrand, Sweden

[73] Assignee: Spirac Engineering AB, Malmo, Sweden

[21] Appl. No.: 316,281

[22] Filed: Feb. 27, 1989

[30] Foreign Application Priority Data

Feb. 29, 1988 [SE] Sweden .............................. 88007034

[51] Int. Cl.⁵ .............................................. F16H 27/02
[52] U.S. Cl. ........................................ 74/89; 74/89.15
[58] Field of Search .................... 74/89, 89.15, 424.5, 74/57

[56] References Cited

U.S. PATENT DOCUMENTS

| | | | |
|---|---|---|---|
| 508,219 | 11/1893 | Goodwin | 74/89.15 X |
| 2,944,431 | 7/1960 | Dexter | 74/89 |
| 3,040,356 | 6/1962 | Vosbikian et al. | 74/89.15 X |
| 3,363,434 | 1/1968 | Kuhn et al. | 74/89.15 X |
| 3,736,801 | 6/1973 | Bloom et al. | 74/89 |
| 4,226,128 | 10/1980 | Dellantonio | 74/89 X |
| 4,285,499 | 8/1981 | Zukausky | 74/57 X |
| 4,544,083 | 10/1985 | Schroeder | 74/89.15 X |

Primary Examiner—José V. Chen
Attorney, Agent, or Firm—Ladas & Parry

[57] ABSTRACT

A driving device comprising a shaftless spiral rotatable around its longitudinal axis and enclosed by a limiting structure. The limiting structure has a first end region and a second end region corresponding to each end of the spiral. The shaftless spiral encloses a sliding body which is provided with an element projecting radially from the sliding body, between two adjoining spiral turns of the spiral and has a part located radially outside the spiral turns in a slot oriented substantially in the axial direction of the limiting structure. A driving element rotates the spiral, which moves the sliding body and consequently the projecting element in the longitudinal direction of the spiral.

11 Claims, 2 Drawing Sheets

DRIVING DEVICE

FIELD OF THE INVENTION

The present invention relates to a driving device.

BACKGROUND AND PRIOR ART

A need exists in many technical applications for a driving device intended to act upon a body so as to move it along a predetermined path. Often said path is mainly linear, but applications also occur where the movement takes place in a curved path (curved track). In certain cases the movement takes place at the same time as the body describes a turning, or possibly a rotational, movement at least during a part of its movement along the path. Frequently, demands are made for a rapid movement and many times it is desired that the driving device should function reliably under difficult environmental conditions where dirt and particles have a disturbing effect, such as a corrosive or abrasive effect on the driving device.

To meet the abovementioned needs it is known to use e.g. linear motors, hydraulic components (cylinders and pistons), articulated couplings, screw rods, etc.

Electromechanical devices, which usually consist of a rotating threaded spindle along which a torsionally rigid "nut" acts as a driver for the linear movement, offer only limited stroke lengths, since the spindle is merely supported at its two ends. Such devices are also easily affected when installed in environments where e.g. solid particles and dirt deposit on the threads of the spindle and in such environments said devices as a rule present unsatisfactory operational reliability.

The abovementioned technique, as a rule, is space-demanding, solves problems only within limited technical areas and demands, especially in cases of extended paths of motion, that the structures should be mechanically stable. This stability is difficult to achieve with the driving devices previously known and referred to above unless they are given larger dimensions than those demanded by the force or power actually required. Automatic drives for pneumatic and hydraulic equipment are expensive. Consequently the known techniques involve considerable costs.

SUMMARY OF THE INVENTION

The present invention provides a driving device of a particularly simple construction where the aforementioned needs are met at the same time as the problems indicated are solved. The invention is usable in a multitude of applications where a need exists for moving a body along a predetermined path.

In a preferred embodiment of the invention a spiral is surrounded by an elongated casing of a substantially circular inner cross-section. This embodiment is particularly appropriate for use in cases of long stroke lengths, since it makes it possible to allow the spiral to be in touch with the casing essentially along the entire length of the casing. The supporting function of the casing makes possible long stroke lengths combined with simple and light constructions and moreover, permits rapid movements. The constructional features of the device also imply such wide tolerances that surrounding liquids, intruding particles or dirt do not interfere with the function of the device.

BRIEF DESCRIPTION OF THE FIGURES OF THE DRAWING

The invention will be described below in more detail in connection with a number of figures of the drawing, wherein.

DETAILED DESCRIPTION OF PREFERRED EMBODIMENTS

Figure 1:
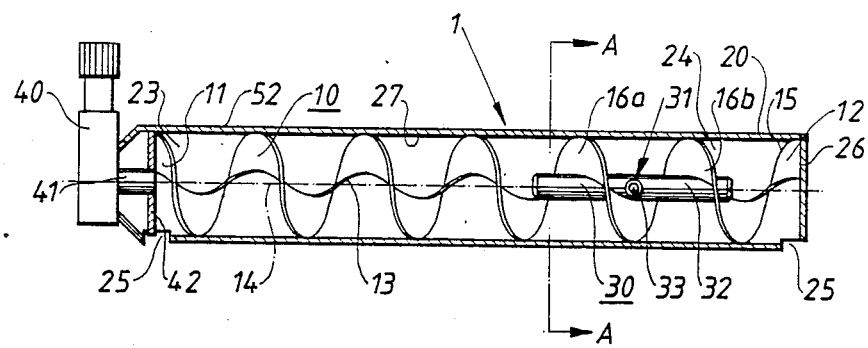
FIG. 1 is a sectional side view of a first embodiment of the driving device.
Figure 2:
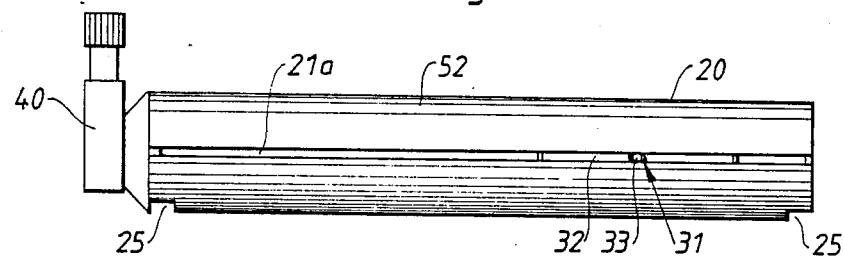
FIG. 2 shows a driving device provided with a slot and seen from the side.
Figure 3:
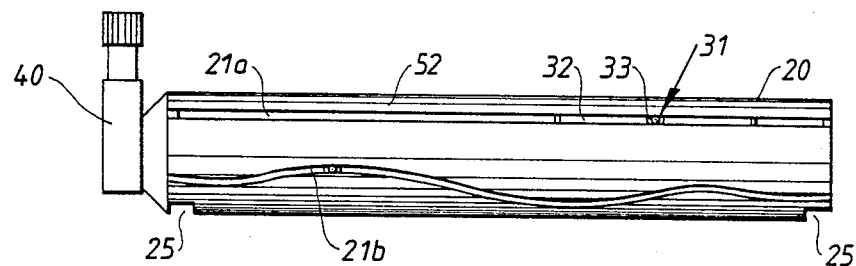
FIG. 3 shows the driving device with two slots seen from the side.

In the embodiment of the invention shown in FIGS. 1-3 will be found a driving device 1 comprising a shaftless spiral 10 with a first end region 11 and a second end region 12. Two spiral turns located adjoining one another have the reference numerals 16a, 16b. In the embodiments shown the first end region constitutes the driving end of the spiral wherein the spiral is connected via a clutch 42 to a driving shaft 41 which in turn is coupled to a motor 40. The spiral 10 is provided with a generally rounded limiting surface 13 facing its geometrical center axis 14. The outer limiting surfce of the spiral has the reference numeral 15. In genercal the spiral is dimensioned so that it is largely dimensionally stable in its longitudinal direction. In some applications, by contrast, the spiral is adapted so that a certain amount of deformation transversely to its axial direction is permitted.

In FIG. 1 the spiral 10 is shown in an embodiment of the invention wherein the spiral has a substantially consistent pitch along its entire length. In accordance with the invention the spiral in certain embodiments is adapted so that its pitch is different in different parts of the spiral. It is here a matter of the spiral in certain embodiments being "lefthand" in some parts and "righthand" in other parts.

Figure 5:
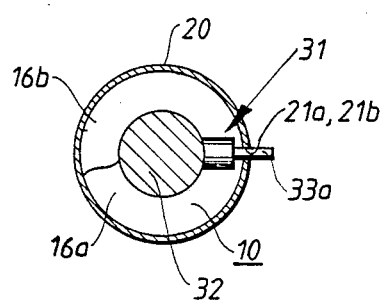
FIG. 5 is a section taken on line A—A in FIG. 1

The spiral is surrounded at least partly by a limiting means 20 (see also FIG. 5) which in the embodiment shown is formed as a casing 20 of a substantially circular cross-section. The casing forms a wall 52 with an inner limiting surface 27 facing towards the spiral and has a first end region 23 and a second end region 24 whose positions largely correspond to the first end region 11 and the second end region 12 respectively of the spiral. The casing as a rule is provided with openings 25 to which on rotation of the spiral any contaminations, e.g. particles or bodies which entered into the cavity of the casing, are transferred and through which openings said contaminations are removed from the cavity. In certain applications the casing is closed off next to its second end region by an end wall 26 which as a rule is arranged substantially perpendicular to the axial direction of the casing. The casing is provided with one or more slots 21a, b (see FIGS. 2 and 3) which extend in the longitudinal direction of the casing and are in the form of through-slots 21a, 21b in the wall 52 of the casing. In some applications the slots are mainly straight while in other applications at least some of them are curved.

Figure 6:
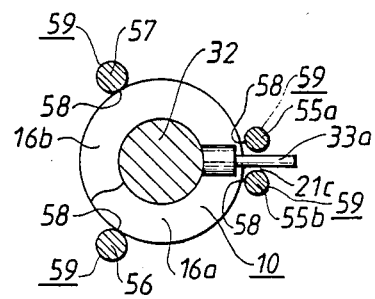
FIG. 6 shows a section corresponding to section A—A in FIG. 1 for an alternative embodiment of the driving device.

An alternative embodiment of the driving device is shown in FIG. 6 where the limiting means 59 for the spiral is formed by four bars 55a, b, 56, 57 oriented substantially in the longitudinal direction of the spiral. Two of the bars 55a,b are located close to one another and form between them a gap 21c which is provided in the longitudinal direction of the spiral. For the rest the bars have such a mutual orientation and location that they enclose the spiral 10 with little play. It is obvious that in certain embodiments more than one gap is provided in the circumferential direction of the spiral and/or more than four bars are included in the limiting means formed by the bars. The surface of the bars facing towards the spiral has the reference numeral 58. In a simplified embodiment the limiting means is formed by only three bars distributed around the circumference of the spiral.

FIGS. 1-3 also illustrate a sliding body 30 enclosed by the shaftless spiral 10. The sliding body has a central part 32 provided with a projecting element 31 which passes between two spiral turns 16a, 16b adjoining one another. The projecting element has an outer part 33a, 33b which co-operates with the slots 21a, 21b, alternatively the gap 21c, and as a rule projects through the slots or gap, respectively. The outer part as a result constitutes e.g. a driver for the movement of a body or a position indicator which e.g. co-operates with control means, e.g. limit switches for the control of the motor 40 and consequently the movement of the sliding body inside the spiral.

Figure 4A:
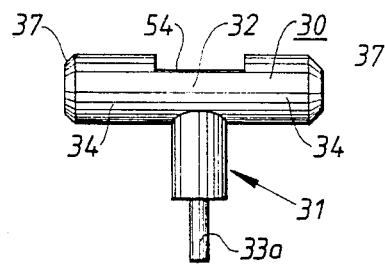
FIGS. 4a-c show embodiments of a sliding body forming part of the driving device.
Figure 4B:
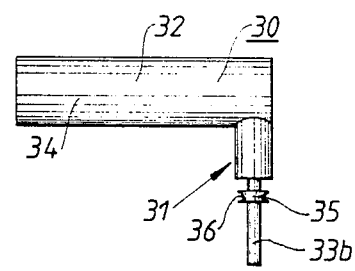
Figure 4C:
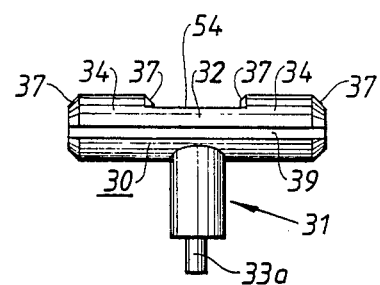

In FIGS. 4a-c are shown different embodiments of the sliding body 30. Its central part 32 is provided with one or more substantially cylindrical portions 34 which co-operate with the limiting surfce 13 of the spiral 10 directed towards the geometrical axis of the spiral for guiding the orientation of the sliding body. In FIG. 4a is shown an embodiment where the cylindrical portions 34 are separated from one another in the longitudinal direction of the sliding body 30 by a recess 54 in the central part 32, while FIG. 4c shows an embodiment where the cylindrical portions are separated from one another by means of a longitudinal groove also in the circumferential direction of the central part 32 of the sliding body.

In applications where the separation in the circumferential direction is necessary there is generally no need for the cylindrical portions 34 to be separated also in the longitudinal direction of the central part 32. The central part 32 in many cases is provided with bevels 37 so as to facilitate the guiding of the sliding body when it travels inside the shaftless spiral 10. Thanks to the bevels a safe guidance of the sliding body, which is independent of contaminations, is achieved. Bevels are appropriate also when the limiting surface 13 of the spiral towards the geometrical center axis is not rounded. The length of the central part 32 is so chosen that the same, the consequently also the cylindrical portions 34, are enclosed at least by substantially one whole turn of the spiral 10. In this manner the sliding body is assured of the necessary axial orientation during displacements in the axial direction of the spiral. The bevels 37 of the sliding body provided in certain embodiments are particularly appropriate for use when the inner limiting surface 13 of the spiral is not rounded.

In order that the sliding body during its travel inside the spiral should not "capsize", the radius of the cylindrical portions 34 as a rule is chosen so, that the spiral 10 encloses the central part 32 with relatively little play. Similarly, the extension of the projecting element 31 in the longitudinal direction of the central body as a rule is adapted to the distance between two spiral turns 16a, 16b adjoining one another, so that the extension substantially closely corresponds to the distance between two sprial turns 16a,b adjoining one another. As a result the projecting element passes with little play between the spiral turns, thus assuring a good control of the movement of the sliding body, and that backlash is prevented, for example, upon a change of the rotational direction of the spiral.

In certain applications, as shown, for example, in FIG. 4a, such cylindrical portions 34 are arranged on each side of the projecting element 31, whereas in other applications, see FIG. 4b, the projecting element has an asymmetrical location which in itself implies an embodiment where the cylindrical portion or the cylindrical portions of the sliding body are provided only on one side of the projecting element. This latter embodiment is particularly suitable where the outer part 31 of the projecting element should be capable of being moved as closely to the end regions 23, 24 of the casing 20 as possible. In FIG. 4b is shown also how a guide wheel 35 with a contact groove 36, whose diameter corresponds to the width of the slots 21a, 21b or the gap 21c, is rotatably supported so that through co-operation with the slot it guides the position of the projecting element during movement of the sliding body in the longitudinal direction of the casing. In the embodiments where the limiting means 59 is formed of only three bars, movement of the sliding body in the axial direction of the spiral at a change in the direction of rotation is delayed until the outer part 33 of the projecting element 31 through rotation of the spiral is moved from resting against one of the bars to resting against one of the two other bars.

Within the concept of the invention, there are also other applications, where more than one sliding body is provided inside the spiral 10, where each sliding body is provided with more than one projecting elements, where the cylindrical part of the sliding body consists of two or more bodies rotatable in a circumferential direction in relation to one another, each having at least one projecting element, or where at least one of the projecting elements is rotatably supported in relation to the central part of the sliding body. In the latter application there is thus a possibility of using with a single sliding body two drivers, the position of one driver being altered in the circumferential direction of the casing when the sliding body is moved in the longitudinal direction of the casing.

Embodiments where the spiral 10 is supported only next to one end (drive end) bring with them the advantage, that the spiral owing to its weight and its elasticity transversely to the longitudinal direction of the spiral will in the lower part of the casing 20 be in contact with the lower limiting surface 27 of the same. On rotation, moreover, the spiral, especially if it is subject to the effect of a force (momentum) via the sliding body, will be in touch, at least momentarily, with other parts of the casing, so that the spiral scrapes clean the inner limiting surface of the casing from contaminations which may penetrate into the casing cavity. Owing to the spiral being in touch with the lower part of the casing, contaminations will be moved to any of the openings 25 of the casing on rotation of the spiral. On displacement of the sliding body 30 inside the spiral in its axial direction the interior of the spiral is cleaned from contaminations and, on passing of the projecting element along the spiral turns, the latter are cleaned from any contaminations. Thus, the device is wholly self-cleaning and capable of operating in dirty and unfavorable environments. It is also suitable to be used wholly or partly immersed in liquid, since the presence of the latter has no negative effect whatever on the function of the driving device. Corresponding self-cleaning effects are obtained also in the embodiments where the casing is replaced by the longitudinal bars 55a,b, 56,57. It has been found in practice that the device according to the invention has a very long life.

In the application of the invention the spiral 10 is rotated by the driving means (motor) 40, the projecting element 31, and with it the sliding body 30, being moved in the axial direction of the spiral in that the spiral, in contact with the projecting element and performing a relative movement in relation to the same, moves the projecting element in the axial direction of the spiral. This effect is obtained in that the sliding body, by means of one or more outer parts 33a-c of its projecting element 31, passes through the slots 21a,b or the gap 21c and is thus hindered from accompanying the spiral in its rotational movement. The position of the sliding body 30 and thus that of the driver 33 is determined, therefore, by how much the spiral has rotated and in some applications, also by the curvature of the slots 21a-c. By variation of the speed of rotation of the spiral, the pitch of the spiral and/or the curvature of the slots the speed of the sliding body and consequently the movement of the driver is determined, and also, to a certain extent, the maximum force which the driver of the projecting element can exert on the means to which the driver is connected.

It is also evident from the above description that in certain embodiments the casing is dimensioned so as to stabilize mechanically the shaftless spiral by limiting the deformation of the spiral transversely to the longitudinal direction of the spiral when the spiral is in contact with the inner limiting surface of the casing. The casing in turn, especially in the case of long driving devices is mechanically stabilized by external means. The flexibility of the spiral transversely to its longitudinal direction is compensated by the mechanical strength of the casing which, where appropriate, is intensified by external mechanical stabilizing elements so that, even in the case of long stroke lengths, the driving device can be designed so that its weight will be low. The mechanical stability implies that the spiral in certain applications is designed with a large pitch which means high speeds of movement at the same time as the driving device has a low weight.

In some embodiments of the invention the spiral 10 is coupled to a driving element in a region between the first end region 23 and the second end region 24. Between the engaging or coupling region of the driving element and the respective end region the spiral surrounds at least one sliding body 30a,b. Through selection of e.g. the pitch of the respective spiral part and "blade direction" it becomes possible to determine the direction of movement, the speed of movement and/or the length of stroke of the respective sliding body. The drivers connected to the respective sliding body will as a result thereof describe courses of movement which are different from one another.

As is evident from the above description, the invention provides a particularly compact, simple and sturdy construction of a driving device comprising one or more drivers movable in predetermined paths. The device, which in some embodiments forms a completely closed system, is well protected against external influence and provides the possibility of a simple variation of the speed of movement of the respective driver and can be controlled by simple automatic means, for example limit switches or a phase inverter of an electric driving motor, etc.

The above detailed description refers only to a limited number of embodiments of the invention, but it will be readily obvious to those versed in the art that the invention encompasses a large number of embodiments within the scope of the following claims.

What is claimed is:

1. A driving device comprising a shaftless spiral rotatable around its longitudinal axis and enclosed by limiting means having a first end region and a second end region, said end regions corresponding to each end of the spiral, the shaftless spiral enclosing a sliding body including an element projecting from the sliding body, which passes between two adjoining spiral turns of the spiral and has a part located radially outside the spiral turns in a slot oriented substantially in the axial direction of the limiting means, said spiral being journalled only adjoining the first end region of the limiting means and said spiral along at least a part of its length being in contact with an inner limitation of said limitation means, said sliding body having a length exceeding the distance between two adjoining spiral turns of said spiral.

2. A device as claimed in claim 1, wherein said slot has a substantially linear orientation.

3. A device as claimed in claim 1, wherein at least parts of said slot form a curved line.

4. A device as claimed in claim 1, wherein more than one slot is provided in said limiting means.

5. A device as claimed in claim 1, wherein said limiting means comprises a casing which substantially encloses the shaftless spiral.

6. A device as claimed in claim 4, wherein said slot extends through the wall of the casing and in which slot at least a part of the outer part of the projecting element is located outside the spiral turns.

7. A device as claimed in claim 1, wherein said limiting means comprises at least three bars surrounding the spiral and oriented substantially in the longitudinal direction of said limiting means.

8. A device as claimed in claim 7, wherein said limiting means comprises at least four bars surrounding the spiral, and for the formation of the slot two of said bars are arranged close to one another to form a gap therebetween.

9. A device as claimed in claim 1, wherein said sliding body includes one or more substantially cylindrical portions which co-operate with a limiting surface of the spiral facing the geometrical center axis of the spiral for guidance of the orientation of the sliding body.

10. A device as claimed in claim 9, wherein said cylindrical portions are enclosed by at least one turn of said spiral.

11. A device as claimed in claim 10, wherein the radius of said cylindrical portions is chosen so that said spiral encloses said sliding body with relatively little play.

* * * * *